…

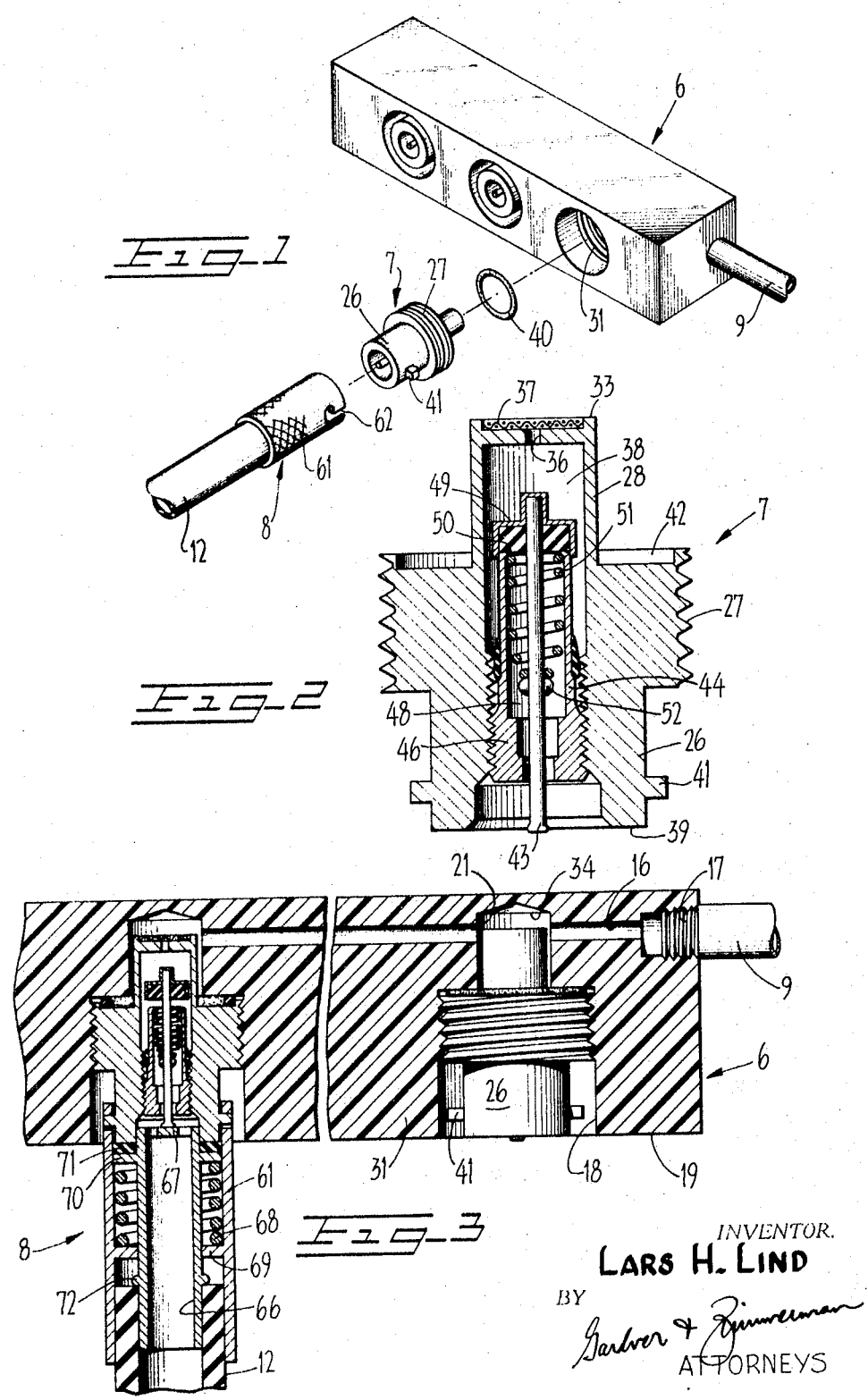

United States Patent Office 3,462,117
Patented Aug. 19, 1969

3,462,117
VALVE ACTUATED OXYGEN SUPPLY SYSTEM
Lars H. Lind, c/o A.I.R. Corp., Oakland International Airport, Oakland, Calif. 94614
Filed Mar. 8, 1967, Ser. No. 621,573
Int. Cl. F16l 37/28
U.S. Cl. 251—149.6
9 Claims

ABSTRACT OF THE DISCLOSURE

An oxygen system having a manifold with a plurality of valve elements disposed substantially entirely within the confines of the manifold, with such elements being adapted to be opened by a valve actuator, the valve actuator being attached to the hose of an oxygen mask.

BACKGROUND OF THE INVENTION

In connection with private aircraft, i.e., as opposed to commercial aircraft wherein an entire cabin may be pressurized, there is sometimes provided an oxygen system which provides the occupants of the plane with a source of oxygen when the aircraft ascends to some predetermined altitude. One of the disadvantages in prior systems available for private aircraft use is their relatively large size and substantial weight frequently having dangerous projections in the aircraft cabin.

SUMMARY OF THE INVENTION

In accordance with the present invention, there is provided an oxygen system which overcomes the disadvantages of oxygen consoles and systems heretofore available for private aircraft. The invention provides an oxygen system which is extremely lightweight and compact and which eliminates the normal projections into the cockpit or cabin of the plane. The system of the present invention also provides for any reasonable number of individual oxygen outlets at a single given console.

The invention further contemplates a system in which a simplified valve construction is utilized, and in which the female component of such a system may be entirely within the console and a relatively short male fitting may be utilized to effect the oxygen flow.

BRIEF DESCRIPTION OF THE DRAWINGS

FIGURE 1 is an exploded perspective view of the apparatus of the present invention.

FIGURE 2 is a vertical cross-sectional view of one of the female valve elements removed from the manifold.

FIGURE 3 is a longitudinal cross-sectional view of the construction shown in FIGURE 1 and showing the valve in an open position.

DESCRIPTION OF THE PREFERRED EMBODIMENT

As above explained, the apparatus of the instant invention is particularly adapted for aircraft use, and is intended to provide a ready source of available oxygen by merely inserting a male valve actuator element which is attached to a oxygen mask hose into the oxygen console and into engagement with a female valve element positioned therein.

As here illustrated, the apparatus broadly consists of a manifold 6 in which a plurality of female valve assemblies 7 are provided. The assemblies 7 are normally closed (as illustrated in FIGURE 2) so that no oxygen passes from the manifold, but are adapted to be opened when engaged by a male valve actuating member 8. Before going into detail as to the novel constructional features, it should be explained that the manifold 6 is connected by a high pressure line 9 to an oxygen supply tank or the like (not shown). Also, as is customary in the art, between the manifold and the tank, suitable regulators and/or pressure reducers may be installed. The valve actuator 8 is connected to a flexible line 12, which in turn is connected to an oxygen face mask (not shown).

Referring first to the manifold 6, the same may be formed from a generally square block of suitable form retaining plastic material and of any desired length, depending upon the number of valves or outlets which are to be tied into such manifold. The manifold is provided with a longitudinally extending passage 16 which terminates in a tapped portion 17 into which the line 9 may be threadedly engaged. Discharge outlets for the manifold are provided by bores 18 extending from the front face 19 of the manifold, and such bores terminate in a diametrically reduced portion 21 which intersects the manifold passage 16. In this manner, oxygen under pressure may be delivered to the front face 19 of the manifold through the bore portions 21 and 18 respectively. It is to be understood that the number of bores will correspond to required number of oxygen outlets along the length of the manifold.

Suitably inserted in each of the bores 18 is one of the female valve assemblies 7 and as an important feature of this invention, the entire mechanism is disposed within the confines of the manifold and rearwardly of its front surface 19 so that no projections of any kind extend into the cabin of the aircraft which could present a potential source of danger of injury to the occupants. As illustrated, each of the valve assemblies includes a cylindrical body 26 which expands into an externally threaded portion 27, and then continues with a diametrically reduced cylindrical portion 28. The transverse bore 18 in the manifold is provided with an internally threaded portion 31 which receives the threaded body portion 27 of the valve, and as best illustrated in FIGURE 2 of the drawing, the valve portion 28 is generally disposed in the diametrically reduced manifold bore portion 21 but is spaced from the side wall thereof. It will also be noted that the end 33 of the valve is disposed adjacent the passage 16 but is spaced from the end 34 of the bore 18. The valve end 33 is provided with a passage or opening 36 which is normally covered with a screen 37, and since there is a spacing between the side wall 28 of the valve and the side walls of bore 21, oxygen under pressure may freely pass from the passage 16 through the screen 37 and aperture 36 into the valve chamber 38 which extends to the front end 39 of the valve. As will be understood, the size of the orifice 36 will determine the flow rate of oxygen to the user. For the average oxygen pressure available, the orifice 36 may have a diameter of about 0.016 inch, but may be enlarged to about 0.023 if more oxygen is required. In order to readily insert the assemblies into the manifold, a pair of lugs 41 are provided on the body portion 26 so that a simple spanner wrench or the like may be used to rotate the valves into threaded and locked engagement with the manifold. A proper and effective seal between the valve body and the manifold is provided by recessing the innermost end of the valve portion 27 as indicated at 42, and placing a suitable O-ring gasket 40 in such recess to bear against the manifold shoulder intermediate the bore portions 18 and 21.

Disposed within the chamber 38 is a valve stem assembly which includes a valve stem 43. The stem 43 is axially movable within the stem body 44, the latter being threadedly connected to the inner wall of valve body portion 26 by means of a spider having externally threaded wings 46 which axially receive the stem. The body 44 is provided with an internal chamber 48 and at the upper end of the stem, the same is provided with an end cover or valve 49 which normally seals the upper end of the hollow valve stem body and chamber 48. A spring 51 having one end bearing against an inturned end flange 50 of the body, and another end bearing against a stem projection 52, serves to maintain the stem in its axially outermost position and the cover 49 in a closed position, wherein oxygen within the chamber 38 is trapped therein. As will be appreciated, however, if the valve stem is depressed inwardly, it will urge the cover away from the stem body, and oxygen may then flow through the valve stem passage 48 and between the threaded wings 46 and hence out to the open end of the valve element 7.

In order to open the valve assemblies 7, the male actuator valves 8 are utilized, and the arrangement is such that it is only necessary for the user to push the actuator against the valve stem and rotate the actuator into a locked position, thus permitting the free flow of oxygen past the valve stem, through the actuator and the attached line 12 to the individual oxygen mask. The actuator is characterized by the elimination of any projection from the cylindrical body portion 61 thereof. On diametrically opposed portions of the body there is provided L-shaped slots 62 which are adapted to be engaged with the lugs 41 of the valves when the actuator is inserted onto the valve. It will of course be understood that the inner diameter of the body 61 is such as to receive the body portion 26 of the valve and as will be presently explained, when the valve stem is forced inwardly, it is possible to rotate the actuator so that the lugs 41 will be retained within the circumferentially extending portions of the slot 62.

Disposed within the body of the actuator is a tubular member 66 having an upper end wall 67 which is suitably perforated to permit the passage of oxygen therethrough. The perforations in the wall 67 are radially offset from the center thereof. The member 66 is normally maintained in an extended position by means of a spring 68 bearing against an inward flange 69 of the body and flange 70 of the member 66. A sealing gasket 71 is disposed at the upper end of the body for engagement with the valve end wall 39. When the actuator is inserted into the bore 18, the end plate 67 will engage and displace valve stem 43 inwardly, moving cover 49 into its open position as shown in FIGURE 3. Such movement of the actuator will also permit rotation of the actuator so that the bayonet connection between the groove 62 and lugs 41 may be effected. The connection will be maintained due to the spring 68 urging the body upward into appropriate sealing engagement. It will be seen that at all times the outermost end wall 67 of the member 66 is maintained below the end of the body 61 by providing a stop ring 72 on the member engageable with flange 69. Such stop may also be used to limit the insertion of the flexible tube 12 on the member.

From the foregoing description, it will be appreciated that the oxygen apparatus is relatively simple to construct and install, and is likewise susceptible to ready change as to the number of available units required for any given installation. Also, since all of the operating portions of the mechanism are substantially flush or recessed, there will be no projections into the aircraft, and even the actuating element may be relatively simplified.

What is claimed is:

1. Apparatus of the character described including a manifold having a passage therein and adapted to be connected to a source of oxygen under pressure, means defining a bore in said manifold traversing and in flow communication with said passage and extending to one surface of said manifold, a valve assembly insertable in said bore from said surface and having a chamber therein, said assembly having an apertured end wall in flow communication with said passage and said bore, means for releasably securing and sealing said assembly in said bore, said assembly being contained substantially completely within the lateral extent of said manifold, a tubular member within said assembly chamber, a valve overlying said member adjacent said end wall, a valve stem secured to said valve and having a distal end adjacent said one surface of said manifold, means normally keeping said valve in closed position on said tubular member, and an actuator member separate from and releasably engageable with said assembly for engaging said distal end of said valve stem and releasably opening said valve to establish communication from said passage through said tubular member to said actuator element.

2. Apparatus as set forth in claim 1 in which said assembly has portions thereof laterally spaced from the walls of said manifold bore, and said tubular member has an internal chamber normally closed at one end by said valve and open at the other end thereof adjacent said manifold surface.

3. Apparatus as set forth in claim 2 in which said assembly has screen means overlying said aperture in said end wall.

4. Apparatus as set forth in claim 1 in which said manifold comprises a generally rectangular block of plastic material, and said valve assembly is threadedly connected to said manifold with the inner end portion thereof in spaced relation to portions of said manifold bore.

5. Apparatus as set forth in claim 1 in which said actuator member is provided with a passage in communication with said tubular member, said actuator element having a cylindrical body portion, and the valve stem engaging portion being recessed within the length of such portion.

6. Apparatus as set forth in claim 5 in which said valve assembly is radially spaced from said manifold bore adjacent the outermost portion thereof, and said body portion of the actuator member being insertible in the annular space between such bore and assembly.

7. Apparatus as set forth in claim 1 in which said manifold bore has a threaded portion intermediate the ends thereof, and said valve assembly has a matching threaded portion of enlarged diameter intermediate its ends for securing said assembly in said bore.

8. Apparatus as set forth in claim 7, in which said bore and said assembly each has a transverse shoulder at the inner end of said threaded portions, and resilient sealing means interposed between said shoulders.

9. A valve actuator member comprising a cylindrical body having a slot at one end thereof for receiving a lug of a valve element, a tubular member telescopically slidable in said body and having an apertured end wall disposed inwardly of said one end of the body, spring means normally urging said member axially towards said one end of the body, means limiting the amount of said axial movement, the other end of said member being adapted to receive a flexible hose in telescopic engagement, and an anular resilient element surrounding said member adjacent the apertured end wall thereof and extending to the inner surface of said body and axially movable with said member, said element being adapted to engage an annular end wall of a valve element, said end wall being adapted to engage a valve stem, the aperture in said end wall being radially offset from the center thereof.

(References on following page)

References Cited

UNITED STATES PATENTS

| | | | |
|---|---|---|---|
| 2,288,565 | 6/1942 | Green | 251—149.6 XR |
| 2,305,841 | 12/1942 | Carlson | 251—149.6 |
| 2,457,052 | 12/1948 | Le Clair | 251—149.6 XR |
| 2,628,850 | 2/1953 | Summerville | 251—149.7 |
| 2,908,511 | 10/1959 | Rogers | 137—614.05 XR |
| 3,242,572 | 3/1966 | Staunt | 137—454.5 XR |
| 3,357,599 | 12/1967 | Douglas et al. | 251—149.7 XR |

FOREIGN PATENTS

| | | |
|---|---|---|
| 636,814 | 2/1962 | Canada. |
| 588,745 | 2/1925 | France. |
| 29,266 | 3/1925 | France. |
| | | (1st Addition to 586,533) |

DANIEL BLUM, Primary Examiner

U.S. Cl. X.R.

137—608, 614.05